2,867,523

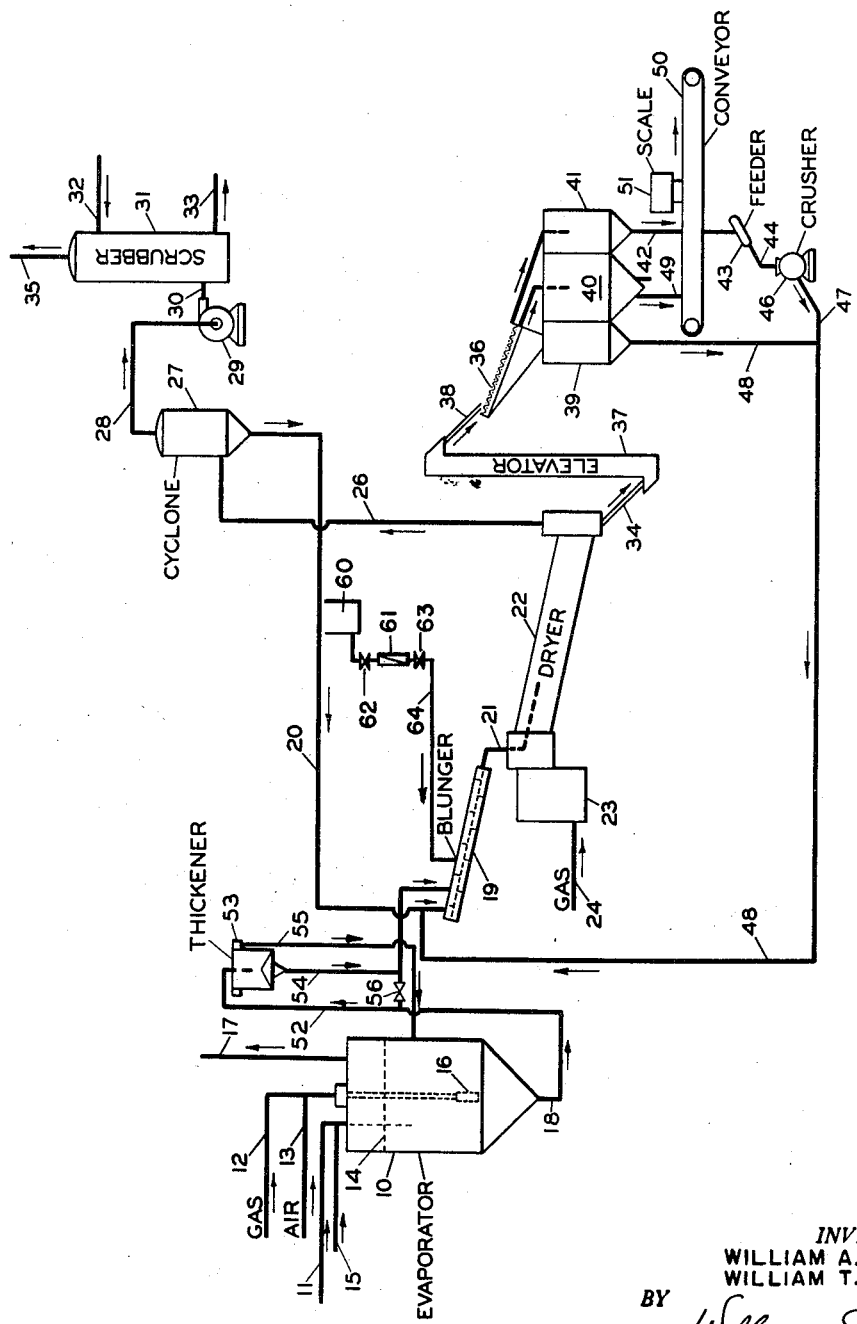

AMMONIUM SULFATE PRODUCTION

William A. Lutz, Westport, and William T. Marston, Fairfield, Conn., assignors to Dorr-Oliver Incorporated, a corporation of Delaware Application July 28, 1953, Serial No. 370,694

2 Claims. (Cl. 71—61)

This invention relates to a process for making granular ammonium sulfate and, more specifically, it relates to an improvement for increasing the production of ammonium sulfate granules. This invention relates to a process of making an improved ammonium sulfate granule adaptable for use particularly as a fertilizer.

There are numerous processes whereby ammonium sulfate crystals are prepared and it is known from U. S. Patent No. 2,631,084 that ammonium sulfate granules may be prepared. Broadly the aforementioned patent relates to a process whereby there is formed a magma of very fine ammonium sulfate crystals, which magma is mixed with fine granules of recycled dry ammonium sulfate in a blunger wherein the fine crystals deposit on the recycled granules to form a quantity of moist production-size granules. These granules are passed to a kiln for drying and thence to a classification zone from which there is derived a middling or production-size material, a fine material which is recycled and an oversize or coarse material which is ground and recycled. Specifically this patent application relates to an improvement on that process in its broader phases.

It is therefore an object of this invention to provide an improved process for making ammonium sulfate granules.

Another object is to increase the production of ammonium sulfate granules in existing plants or to reduce the sizes of certain equipment in new plants.

Another object is to increase the amount of ammonia available in the ammonium sulfate granules, particularly for their use as a fertilizer. At the same time it is an object to establish and maintain the neutrality of the granular product.

A further object is to produce satisfactory granules of higher moisture content, thus simplifying the control over the process.

In the aforementioned known process there is made a magma of fine ammonium sulfate crystals by evaporating a solution of ammonium sulfate under such conditions that extremely fine cystals result. One method of accomplishing this is to feed the solution to a submerged flame concentrator or evaporator. In this type of evaporator a gas, such as natural gas, is burned below the liquid level of the material therein to supply heat for the evaporation of the liquid content of the solution. Large quantities of flue gas are generated below the surface of the solution by thus burning the gas, which to escape must pass upwardly through the solution and to a stack. The removal of the water from the solution in the form of vapor raises the concentration of the material, for instance ammonium sulfate, until crystals are formed. The flue gas passing through the ammonium sulfate solution causes considerable turbulence, flash dehydration and flash crystallization. These conditions are favorable for rapid formation of a large number of crystal nuclei and minimum growth of these nuclei. It is these small crystal nuclei which make the most desirable magma for feed to granulation equipment because they have not been allowed to grow to the long needle-like crystals which would normally result if crystal growth were not inhibited. By so treating the ammonium sulfate solution and forming small crystals, a magma of over 30% and up to 80 to 85% crystal solids may be obtained without any attendant operational difficulties. The use of a submerged flame-type evaporator is not entirely necessary but instead any type of a submerged combustion evaporator can be used. No precautions need be taken to remove crystallization inhibitors, such as trivalent iron, aluminum, etc., and in fact it may be found desirable to add such inhibitors in order to reduce the crystal size.

The term "magma" as used in this specification refers to a mixture of ammonium sulfate solids and saturated mother liquor in which appreciable quantities of the total ammonium sulfate is in a solid crystal form. The term "blunger" as used herein designates a mixing apparatus generally containing paddles or the like. It usually comprises a hollow tube with a shaft running along its axis to which are attached a number of blades or paddles which, when the shaft is rotated, mix the material introduced thereto.

The crystal magma is passed to a blunger wherein it is admixed with recycled dry ammonium sulfate granules. The seed granules are larger than the crystals in the magma and in general are returned because they are not quite large enough to meet specifications, such as for fertilizer and the like. The ammonium sulfate seed will most frequently include those granules which were of too great a size and were reduced in size by crushing, and very fine ammonium sulfate particles recovered from the drying gas.

In the blunger the small crystals produced in the submerged flame concentrator adhere to the recycle granules due to the tackiness of the saturated mother liquor coating the crystals and adhering to the ammonium sulfate seed granules and particles thus forming granules out of the seed and building up the size of the granules during the mixing in the blunger. The tumbling and rolling action of the blunger tends to spherically shape each granule. The granules thus enlarged by the small crystals sticking to them pass to a dryer, preferably a rotary dryer, where much of the remaining moisture is removed and the small crystals become cemented to the recycle granules by crystallization of the ammonium sulfate mother liquor when the water content is evaporated. To form solid granules which will not break easily and which will have a minimum of void space between the crystals thereof, it is essential that the crystals cemented together be of a minimum size and not of a needle-like shape. By a minimum of void space we mean that the space between the cemented crystals will be as small as possible because of the very small crystals used, i. e., 1 to 50, though most usually 5 to 10 microns average length. The presence of the crystal growth inhibitors such as have been previously described will continue to inhibit the formation of any but the smallest crystals in both the blunging and drying steps.

Our invention specifically is an improvement over the foregoing in that we have found that the addition of a small amount of ammonium hydroxide solution, preferably concentrated ammonium hydroxide solution, to the blunger will result in an immediate apparent drying of the granules. This is thought to be due to a decrease in surface tension of the mother liquor solids interface by the addition of the electrolyte ammonium hydroxide which results in a more even coating of all particles by the saturated mother liquor. The ammonium hydroxide that is added at this step in order to achieve the surprising results outlined hereafter is in the order of $\frac{1}{10}$ of 1% by weight of the blunger feed.

To state it another way, a quarter of a ton of blunger feed will require about one litre of concentrated ammonium hydroxide solution. If any excess is added it can be removed by a scrubber system on the flue gases coming from the dryer and returned to the head or beginning of the system.

The use of this minute quantity of ammonium hydroxide results in an apparent drying of the granules so that they seem to the naked eye to be quite dry whereas their moisture content may be actually considerably higher than could be tolerated without this ammonium hydroxide addition. The optimum moisture content of blunger discharge that can be tolerated without this addition is approximately two percent whereas with this invention it has been found that the optimum moisture content may be increased to four percent.

The material from the blunger then passes to a drying step usually conducted in a rotary kiln. As a further result of this invention it has been discovered that little or no agglomeration occurs in the drying step when carried out in a rotary kiln or even when carired out in pans in substitution for the rotary kiln. After drying, it passes to a classification section, from whence the middlings are recovered as production-size, with the fines and the coarse after grinding, being recycled to the blunger.

A further understanding of some of the many aspects of our invention may be had by referring to the attached drawing. The drawing is a schematic flow diagram of a preferred embodiment of our invention. Various additional valves, pumps, and other conventional equipment, necessary for the practice of our invention, will be familiar to one skilled in the art and have been omitted from the drawing for the sake of clarity.

The following description, which will also serve to exemplify our invention, provides one method of operating our process. It is understood, however, while this is representative in general of our process, various minor changes may be made in adapting the process to the various conditions within the scope of the invention.

Refer now to the drawing. An ammonium sulfate solution is introduced to submerged flame evaporator 10 via line 11 for concentrating. Gas and air are introduced to the evaporator through lines 12 and 13 and are burned below the liquid level 14 of the ammonium sulfate in burner 16. The hot combustion gases pass upwardly through the ammonium sulfate removing water in the form of steam, thus increasing the concentration of ammonium sulfate. If crystal growth inhibitors previously discussed are to be used they may be introduced to the ammonium sulfate solution in line 11 by means of line 15. The combustion gases and water vapor are exhausted from evaporator 10 via line 17. By thus removing the water from the ammonium sulfate, the ammonium sulfate is brought to a concentration at which crystallization takes place.

The crystal containing solution from evaporator 10 may be passed directly to blunger 19 via line 18, or more preferably, through a thickener and then to the blunger. When operating in this preferred manner, valve 56 may be closed or partially closed depending on the thickness of the magma from evaporator 10. The magma from evaporator 10 is passed via lines 18 and 52 to thickener 53 which may be of any conventional design. Mother liquor, which is an ammonium sulfate solution, is removed from thickener 53 via line 55 and passed back to evaporator 10. The thickened magma is removed from thickener 53 via line 54 and is passed via line 18 to blunger 19.

Recycle fines are introduced via line 20 to the blunger where they are mixed with the crystal magma. The blunger thoroughly mixes the fines with the magma so that the fine crystals will come in contact with the larger particles and adhere thereto. In this way a granule increases in size as it passes through the blunger. The concentrated ammonium hydroxide is added to the blunger from feed tank 60 through a suitable metering device 61, such as a rotometer, suitably valved at 62 and 63, and finally through feed pipe 64. The thus formed granules are passed from blunger 19 via line 21 to rotary dryer 22. Gases utilized for drying the granules, that is, for removing the last few percent of moisture, are preferably heated to cause more rapid evaporation of the moisture. It is very satisfactory to use flue gas from a dutch oven such as is indicated by number 23 to which gas to be burned is introduced via line 24. The hot gases contact the granules as they are tumbled in dryer 22 and are then removed from the dryer via line 26. The drying gases which are removed via line 26 are passed to cyclone separator 27 which removes small entrained particles of ammonium sulfate. The gas, freed of ammonium sulfate, is then passed from the cyclone separator via line 28, blower 29, and line 30 to scrubber 31 where any gaseous ammonia is recovered therefrom by washing the drying gas with water introduced via line 32 and removed via line 33 or by any other suitable means. The scrubbed gases are removed from scrubber 31 via line 35. The separated ammonium sulfate fines are removed from the bottom of cyclone separator 27 and passed via line 20 to the blunger.

Product ammonium sulfate is removed from dryer 22 via conduit 34 and passed to a screening apparatus 36 by a suitable means such as elevator 37 and conduit 38. Screening apparatus 36 separates the product granules of ammonium sulfate into three different groups: (1) granules finer than those desired, (2) granules within the desired range of size, and (3) granules larger than those desired. These three different groups of granules are collected in hoppers indicated by numbers 39, 40, and 41, respectively. The large granules from hopper 41 are passed via line 42, feeder 43 and line 44 to crusher 46, where they are broken into smaller pieces to be recycled to the blunger. The crushed ammonium sulfate granules are passed via line 47 to line 48 by means of which they are conducted along with the small granules from hopper 39 to blunger 19. The product ammonium sulfate from hopper 40 is pased via line 49 to suitable means for conducting same to storage or bagging such as conveyor 50 and scale 51.

It is within the scope of our invention to manufacture granules of almost any desired size depending only on the number of times the granules are recycled to the blunger.

A comparison of tests made with and without the addition of ammonium hydroxide to this step is as follows:

| | Weight percent of water in feed slurry | Weight percent of water in blunger discharge | Circulating load, seed to slurry | Weight percent of production granules in dryer discharge |
|---|---|---|---|---|
| With ammonium hydroxide | 28.1 | 3.3 | 10.5-1 | 83.5 |
| Without ammonium hydroxide | 19.5 | 2.0 | 10.9-1 | 62.2 |

This increased tolerance in the moisture content of the blunger discharge means that the amount of new feed material to the blunger can be increased considerably while simultaneously decreasing the amount of recycle fines needed. We have found that, whereas a satisfactory recycle rate of fines to new feed is 10:1, with this invention it may be reduced to as low as 5:1. This results in a reduction in size and cost in much of the equipment, notably the blunger, dryer and conveyors, for a given tonnage produced. The tolerance of this additional moisture also makes the process more readily workable and less critical in the fineness of control.

We claim:

1. In the process for producing granular ammonium sulfate particles wherein such particles are produced by concentrating and thickening an ammonium sulfate solution to yield a magma of fine ammonium sulfate crystals, subjecting the resulting magma to agitation in an agitation zone to which fine substantially dry ammonium sulfate crystals are added in an amount sufficient to maintain an optimum moisture content sufficient to promote agglomeration of said crystals into relatively larger granules but insufficient to promote sticking together of the resulting relatively larger granules on subsequent drying, removing granules from said agitation zone, drying said removed granules, and classifying said granules into an intermediate product size fraction as well as an undersize and an oversize fraction, the undersize and oversize fractions constituting the source of dry crystals added to said agitation zone; the improvement enabling maintenance of a relatively higher moisture content in said agitation zone while increasing the yield of said intermediate product size granules therein, comprising adding ammonium hydroxide to the ammonium sulfate magma introduced into said agitation zone.

2. The process according to claim 1 in which the amount of ammonium hydroxide added to the magma is approximately equal in weight to $1/10$ of 1% of the ammonium sulfate magma and dry ammonium sulfate in the agitation zone.

References Cited in the file of this patent

UNITED STATES PATENTS

| | | |
|---|---|---|
| 1,310,306 | Sperr | July 15, 1919 |
| 2,021,093 | Kreisler | Nov. 12, 1935 |
| 2,307,253 | Yee et al. | Jan. 5, 1943 |
| 2,420,517 | Brandner et al. | May 13, 1947 |
| 2,472,794 | Cothran | June 14, 1949 |
| 2,524,341 | Chapman et al. | Oct. 3, 1950 |
| 2,631,084 | Robinson | Mar. 10, 1953 |
| 2,662,811 | Thomsen | Dec. 15, 1953 |